United States Patent Office 3,787,492
Patented Jan. 22, 1974

3,787,492
OIL-SOLUBLE CONDENSATION PRODUCTS OF ALPHA-NITRO ALKYL CHLORIDES AND POLY-AMINO UREAS, AND THE METHOD OF PREPARING SAME
Richard J. Lee, Downers Grove, Ill., assignor to Standard Oil Company, Chicago, Ill.
No Drawing. Filed Dec. 6, 1971, Ser. No. 205,332
Int. Cl. C07c 127/12
U.S. Cl. 260—553 R    6 Claims

ABSTRACT OF THE DISCLOSURE

Oil-soluble products useful as lubricating oil additives to impart detergency and dispersant properties thereto are prepared by the condensation of alpha-nitro alkyl chlorides, having at least 10 carbon atoms in the alkyl substituent, with polyamino ureas in the molar ratio of from about 1.0:0.5 to about 1.0:1.0, respectively.

BACKGROUND OF THE INVENTION

Lubricant deterioration in high speed internal combustion engines causes the formation of lacquer, sludge and carbon deposits in the engines which accelerates engine wear and reduces engine efficiency. The necessity of having effective lubricating oil additives to combat these deposits is well known. Since the development of the positive crankcase ventilation system (PCV), there exists a greater demand for ashless lubricant additives having detergency and/or dispersant properties. Accordingly, an additive for motor oils which has the property of preventing the agglomeration of sludge and the deposition of varnish and sludge on engine parts caused by the deterioration of motor oils due to the high temperatures attained in high speed engines has been developed.

SUMMARY OF THE INVENTION

In accordance with the present invention, oil-soluble products useful as lubricating oil additives are obtained by the chemical condensation of alpha-nitro alkyl chlorides, in which the alkyl substituent contains at least 10 carbon atoms, with a polyamino urea in the molar ratio of from about 1.0:0.5 to about 1.0:1.0, respectively, at a temperature of from about 200° F. to about 450° F. To assist in the removal of water of reaction an inert gas, e.g. nitrogen, may be passed through the reaction mixture. Advantageously, the reaction is carried out in presence of an inert diluent such as a normally liquid hydrocarbon solvent, e.g. xylene or preferably a low viscosity hydrocarbon lubricating oil such as a solvent-extracted SAE 5W grade mineral oil, a white mineral oil and the like. Upon completion of the condensation reaction, the reaction product is filtered and the filtrate washed with water and dried at an elevated temperature, e.g. about 300° F., with purging with an inert gas such as nitrogen.

Preparation of the polyamino urea reactant

The polyamino urea reactant employed in accordance with this invention is suitably obtained by reacting a polyalkylene amine with urea in the ratio of about 2 mols of the polyalkylene amine per mol of urea. The term "polyalkylene amine" used herein means polyamines having the formula

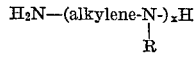

wherein $x$ is an integer of from 2 to about 10, R is hydrogen or a lower alkyl hydrocarbon substituent of from 1 to 4 carbon atoms, and "alkylene" is a lower alkylene, i.e. a divalent open-chain hydrocarbon group having from 1 to about 8 carbon atoms. Such polyalkylene amines include methylene amines, ethylene amines, propylene amines, pentylene amines, heptylene amines, octylene amines, and other polymethylene amines which contain from 2 to 10 alkylene groups and 3 to 11 nitrogens. Specific examples of such polyakylene amines include dimethylene triamine, trimethylene tetramine, pentaethylene hexamine, tetraethylene pentamine, tributylene tetramine, di(heptamethylene) triamine, $N_1,N_2$-dimethyl diethylene triamine, dipentylene triamine, trioctylene tetramine, $N_1$, $N_5$-diethyl tetraethylene pentamine, and decaethylene hendecamine among others.

In the preparation of the polyamino urea, 2 mols of the polyalkylene amine are reacted with 1 mol of urea at a temperature of from about 200° F. to 500° F., with or without an inert diluent, for a period of from about 3 to about 5 hours. It is preferred to first slurry the urea in a portion of the polyalkylene amine, and then add such slurry to the remainder of the polyalkylene amine.

The preparation of the polyamino urea is fully described in U.S. Pat. No. 3,449,362, issued June 10, 1969, which description is incorporated herein by reference.

The alpha-nitro alkyl chloride reactant

In accordance with the present invention, the polyamino ureas described above can be condensed with any alpha-nitro alkyl chloride in which the alkyl substituent contains at least 10 carbon atoms. Suitable alpha-nitro alkyl chlorides are those obtained by reacting alkenes with nitryl chloride in the molar ratio of from about 1:1 to about 1:10, respectively, at a temperature of from about 10° F. to about 150° F., preferably at ambient temperature, i.e. room temperature, for a period of from about 2 to about 10 hours.

Any alkene, having at least one ethylenically unsaturated site, and containing at least about 10 carbon atoms, can be used. Such alkenes include olefins, and olefin polymers containing at least about 10 carbon attoms. Particularly suitable olefin polymers are the $C_2$ to $C_4$ monoolefin polymers containing at least about 20 carbon atoms, preferably from about 30 to about 200 or more carbon atoms, and average molecular weights in the range of from about 300 to about 100,000. A particularly suitable class of alpha-nitro alkyl chlorides are those prepared from normally liquid polypropenes and polybutenes having average molecular weights in the range of from about 300 to about 2,500.

Nitryl chloride ($NO_2Cl$) can be generated in a number of known ways. A conventional method is by the reaction of fuming nitric acid with chlorosulfonic acid. Other methods involve reaction of NOCl and $O_3$, or $N_2O_4$ and $Cl_2$.

The term "alpha-nitro alkyl chloride" as used herein means a nitro-substituted alkyl chloride wherein the nitro group is in the alpha-position to the chloro group. Such alpha-nitro alkyl chlorides can be schematically represented by the formula

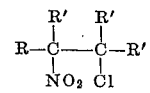

wherein R is alkyl and R' is hydrogen or alkyl.

The herein-described condensation products of the present invention are useful as additives in oleaginous lubricant compositions to impart detergent and dispersant properties thereto. The amounts used will normally range from about 0.1% to about 10%. Suitable lubricating base oils are hydrocarbon oils, e.g. petroleum lubricating oils, synthetic lubricating oils, such as those obtained by the polymerization of hydrocarbons, and other well-known synthetic lubricating oils. Concentrates of a suitable base oil containing more than 10%, e.g. from about 15% to about 50% or more, of the compounds prepared in accordance with the present invention, alone or in combination with other well-known additives, can be used for blending with lubricating oils in proportions desired for particular conditions of use to give finished products containing from about 0.1% to about 10% of the compound of the herein-described invention.

PREFERRED EMBODIMENT OF THE INVENTION

The following is illustrative of preferred embodiments of the herein-described invention:

Example I

Part A.—Preparation of the alpha-nitro alkyl chloride: Two mols of 850 molecular weight liquid polybutene were dissolved in 2 liters of dichloromethane. A stream of nitryl chloride gas, at the rate of 1 cubic foot per hour, was dispersed into the polybutene solution with the aid of nitrogen gas. The total amount of nitryl chloride used was the amount produced by adding 70 ccs. of 1.45 specific gravity nitric acid to 500 grams of chlorosulfonic acid. After the addition of the nitryl chloride at room temperature, the reaction mixture was allowed to stand overnight, and then stripped. A yield of 70% of the corresponding alpha-nitro polybutyl chloride, containing 2.31% chlorine, was recovered.

Part B.—Preparation of the condensation product of the alpha-nitro polybutyl chloride and polyamino urea: A polyamino urea (uramine) was prepared by reacting 189 grams (1 mol) of tetraethylene pentamine with 30 grams (0.5 mol) of urea at 400° F. for 4 hours in an atmosphere of nitrogen. The recovered uramine had a viscosity of 76 SSU at 210° F., and a nitrogen content of 28.8%.

215 grams (0.5 mol) of the above uramine was condensed with 932 grams (1 mol) of the alpha-nitro polybutyl chloride prepared in Part A at 300° F. for 8 hours. The reaction mixture was then filtered, and the filtrate washed with water and then dried by heating at 300° F. with nitrogen purging.

The effectiveness of the condensation products of this invention as lubricating oil dispersants is demonstrated by the Spot Dispersancy Test.

The Spot Dispersancy Test is conducted by mixing 2% by weight, based on the weight of the oil, of the additive to be tested into a measured volume of crankcase lubricant oil which has been used in a Lincoln Sequence V engine test for 394 hours (twice the time of the standard test time). This composition is heated and stirred at about 300° F. for about 16 hours, and an aliquot is transferred to blotting paper. A control is made at the same time by stirring and heating at 300° F. for 16 hours a second volume of the same used oil, containing no dispersant additive, from the 394 hour Lincoln Sequence V engine test, and depositing an aliquot on blotting paper. The deposits on the blotting paper are measured to obtain the average diameter of the outer oil ring ($D_o$) and the average diameter of the inner sludge ring ($D_a$). The ratio of $D_a/D_o$, expressed as percent dispersancy, is an indication of the detergent-dispersant property of the addition agent.

The results obtained when the condensation product of Example I, above, and a control oil were subjected to the Spot Dispersancy Test are given in Table I, below.

TABLE I

| Additive: | Percent dispersancy |
|---|---|
| Product of Example I, above | 65.3 |
| Control (no dispersant) | 30 |

The above data demonstrate the dispersancy property of the products of this invention.

Percentages given herein and in the appended claims are weight percentages unless otherwise stated.

It is to be understood that the invention herein described and claimed is not limited to the preferred embodiments described, but includes such modifications and variations at come within the spirit and scope of the appended claims.

I claim:

1. The method of preparing an oil-soluble lubricant additive, which method comprises condensing at a temperature of from about 200° F. to about 450° F. an alpha-nitro alkyl chloride wherein the alkyl substituent is a polybutyl or polypropyl group having an average molecular weight of from about 300 to about 2,500, with a polyamino urea in the molar ratio of from about 1.0:0.5 to about 1.0:1.0, respectively, said polyamino urea being derived by reacting 2 mols of a polyalkylene amine of the formula

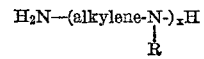

in which the alkylene is a divalent open-chain hydrocarbon group having from 1 to about 8 carbon atoms, R is hydrogen or a lower alkyl hydrocarbon substituent of from 1 to about 4 carbon atoms, and $x$ is an integer of from 2 to about 10, with 1 mol of urea, at a temperature of from about 200° F. to about 500° F.

2. The method of claim 1 wherein the alkyl substituent of said alkyl chloride is polybutyl.

3. The method of claim 1 wherein the alkyl substituent of said alkyl chloride is polypropyl.

4. The method of claim 1 wherein said polyalkylene amine is tetraethylene pentamine.

5. The method of claim 2 wherein the molecular weight of said polybutyl group is about 850, and said polyalkylene amine is tetraethylene pentamine.

6. The oil-soluble condensation product prepared by the method of claim 2.

References Cited

UNITED STATES PATENTS 3,634,493    1/1972    Piccolini _____ 260—482 B

LEON ZITVER, Primary Examiner

M. W. GLYNN, Assistant Examiner

U.S. Cl. X.R.

252—51.5 R